United States Patent
Pfaeffli (10) Patent No.: US 9,346,409 B2
(45) Date of Patent: May 24, 2016

(54) FOLDABLE ROOF RACK ASSEMBLY FOR KAYAKS AND THE LIKE

(71) Applicant: Urs Pfaeffli, Halfmoon Bay (CA)

(72) Inventor: Urs Pfaeffli, Halfmoon Bay (CA)

( * ) Notice: Subject to any disclaimer, the term of this patent is extended or adjusted under 35 U.S.C. 154(b) by 0 days.

(21) Appl. No.: 14/524,379

(22) Filed: Oct. 27, 2014

(65) Prior Publication Data

US 2016/0114733 A1    Apr. 28, 2016

(51) Int. Cl.
*B60R 9/08* (2006.01)
*B60R 9/045* (2006.01)
*B60R 9/048* (2006.01)

(52) U.S. Cl.
CPC .................. *B60R 9/045* (2013.01); *B60R 9/048* (2013.01); *B60R 9/08* (2013.01)

(58) Field of Classification Search
CPC .......... B60R 9/042; B60R 9/08; B60R 9/048; B60R 9/04; B60P 3/1025; B60P 3/1016
USPC .................................................. 224/310, 497
See application file for complete search history.

(56) References Cited

U.S. PATENT DOCUMENTS

| | | | |
|---|---|---|---|
| 3,495,729 A | 2/1970 | Kruse | |
| 3,720,334 A | 3/1973 | Permut et al. | |
| 3,762,587 A | 10/1973 | Longee, Sr. | |
| 3,963,136 A | 6/1976 | Spanke | |
| 4,440,540 A | 4/1984 | Gottlieb et al. | |
| 4,531,879 A | 7/1985 | Horowitz | |
| 5,544,796 A | 8/1996 | Dubach | |
| 5,957,350 A | 9/1999 | Giles | |
| 6,131,781 A | 10/2000 | Murray | |
| 6,158,638 A | 12/2000 | Szigeti | |
| 6,164,507 A | 12/2000 | Dean et al. | |
| 6,428,263 B1 | 8/2002 | Schellens | |
| 6,460,743 B2 * | 10/2002 | Edgerly | B60R 9/048 224/324 |
| 6,520,393 B1 | 2/2003 | Ferguson | |
| 6,561,396 B2 * | 5/2003 | Ketterhagen | B60R 9/08 224/310 |
| 6,634,529 B2 | 10/2003 | Choiniere et al. | |
| 7,036,698 B2 | 5/2006 | Allen | |
| 7,108,163 B1 | 9/2006 | Pedrini | |
| D623,120 S | 9/2010 | Farber | |

(Continued)

FOREIGN PATENT DOCUMENTS

EP    0616576    5/1996
EP    0563463    8/1996

(Continued)

OTHER PUBLICATIONS http://web.archive.org/web/20140815200954/http://www.thule.com/en-us/ca/products/carriers-and-racks/water-sport-carriers/kayak-and-canoe-carriers/thule-hullavator-897xt-_-18974, dated Aug. 15, 2014.

*Primary Examiner* — Adam Waggenspack
(74) *Attorney, Agent, or Firm* — Cameron IP (57) ABSTRACT

There is provided a foldable roof rack assembly. The roof rack assembly includes a mounting assembly connectable to a roof of a vehicle. The roof rack assembly includes a foldable arm having a pair of pivotable rigid portions one of which pivotally connects to the mounting assembly. The foldable arm is moveable from a folded position, in which the portions of the arm are folded together laterally along the roof, to an unfolded position in which the portions of the arm extend outward for receiving and at least partially extending around an object.

16 Claims, 11 Drawing Sheets

(56) References Cited

U.S. PATENT DOCUMENTS

| | | |
|---|---|---|
| 7,810,686 B2 | 10/2010 | Ilgenfritz |
| D637,949 S | 5/2011 | Farber |
| 8,028,874 B2 | 10/2011 | Stiles |
| 8,136,708 B2 | 3/2012 | Sautter et al. |
| D656,887 S | 4/2012 | Bogoslofski et al. |
| D657,301 S | 4/2012 | Bogoslofski et al. |
| 8,167,180 B2 | 5/2012 | Bogoslofski et al. |
| D665,725 S | 8/2012 | Laverack et al. |
| 8,733,604 B2 | 5/2014 | Murray et al. |
| 9,079,541 B2 * | 7/2015 | Farber .................. B60R 9/08 |
| 2003/0189072 A1 | 10/2003 | Edgerly |
| 2005/0082325 A1 | 4/2005 | Bourne |
| 2006/0208021 A1 | 9/2006 | Himle et al. |
| 2007/0007316 A1 | 1/2007 | Witczak |
| 2008/0035688 A1 | 2/2008 | Malone |
| 2010/0213228 A1 | 8/2010 | Dannewitz |
| 2011/0068137 A1 | 3/2011 | Murray et al. |
| 2011/0303711 A1 | 12/2011 | McMillan |
| 2013/0248568 A1 * | 9/2013 | Bogoslofski .............. B60R 9/08 224/324 |
| 2014/0131405 A1 | 5/2014 | Noonan |

FOREIGN PATENT DOCUMENTS

| | | |
|---|---|---|
| EP | 2551151 | 1/2013 |
| WO | 92/09453 | 6/1992 |
| WO | 2004/082999 | 9/2004 |
| WO | 2008/052252 | 5/2008 |
| WO | 2010/064233 | 6/2010 |
| WO | 2013/019815 | 2/2013 |

* cited by examiner

FOLDABLE ROOF RACK ASSEMBLY FOR KAYAKS AND THE LIKE

FIELD OF THE INVENTION

There is provided a roof rack assembly. In particular, there is provided a foldable roof rack assembly for kayaks and the like.

DESCRIPTION OF THE RELATED ART

United States Patent Publication No. 2007/0007316 to Witczak provides a bicycle carrier. The carrier has a rotatable beam on which are mounted foldable support arms having first wheel support means for engaging and entrapping the upper peripheral regions of the wheels of a bicycle. The beam is rotatable into a bicycle carriage mode vertically above the vehicle when the arms are in an arm deployed position and lockable in that position. Resiliently-biased detent means are associated with the support arms mountings for positively locking the arms in the deployed position in relation to the beam, simple movement against the bias effecting disengagement.

However, the above carrier may be relatively limited in the types of objects that it may be carry. Also, the carrier appears to require a relatively high number of parts.

United States Patent Publication No. 2013/0248568 to Bogoslofski et al. provides a surfboard carrier. The carrier is for securing one or more surfing devices for transport upon a carrying vehicle. The carrier includes an elongate base having a sliding base slidingly coupled to the main base and having a locking portion. A displacement hinge having a first end and a second end can be coupled to the elongate base at the first end of the displacement hinge. A middle arm can be coupled to the second end of the displacement hinge. A strap having a first end and a second end can have the first end of the strap coupled to the bottom displacement. A lock coupled to the locking portion can be configured to lock the strap to the locking portion in the event the second end of the strap is inserted into the locking portion of the sliding base.

The above carrier may also be limited in the range of objects that it may be able to readily carry. Moreover, it may be relatively cumbersome to use the carrier in situations where larger objects, such as kayaks, need to be transported and the user is by him or herself.

United States Patent Publication No. 2008/0035688 to Malone provides a loader for loading a kayak or other article onto a roof rack carrier. Typically two carriers may be mounted on a roof rack and the loader is used for each carrier. Each loader has a loading cradle that is slidably mounted in a slide rail and an attachment plate for attaching the slide rail to a carrier. A kayak is supported in the two loading cradles. Each cradle is pushed up the slide rail to lift the kayak near to the carrier. The lifting can be done by a single person in steps. A locking mechanism holds the loading cradle in position on the slide rail and prevents it from sliding backward. The user may move from one loader to the other to sequentially push the loading cradles up the two slide rails, thereby bringing the kayak close to the carriers mounted on the roof rack and in position for loading into the carriers.

The above loader may be relatively bulky and may thus increase drag when not in use, for example.

There is accordingly a need for a roof carrier which lends itself to carrying a large range of objects, which is relatively easy for one person to use when even large objects such as kayaks need to be carried, which has relatively few parts and which may remain compact when not in use.

BRIEF SUMMARY OF INVENTION

There is provided an improved foldable roof rack carrier disclosed herein that may overcome the above disadvantages.

There is accordingly provided a foldable roof rack assembly. The roof rack assembly includes a mounting assembly connectable to a roof of a vehicle. The roof rack assembly includes a foldable arm having a pair of pivotable rigid portions one of which pivotally connects to the mounting assembly. The foldable arm is moveable from a folded position in which the portions of the arm are folded together laterally along the roof to an unfolded position in which the portions of the arm extend outward for receiving and at least partially extending around an object.

According to another aspect, there is provided a foldable roof rack assembly for a vehicle having a roof and a side. The foldable roof rack assembly includes a mounting assembly. The mounting assembly includes a base mount extendable along the roof of the vehicle. The base mount has an end positionable adjacent to the side of the vehicle. The mounting assembly further includes a pivotable bracket pivotally connected to the end of the base mount. The roof rack assembly includes an arm pivotally connecting to the bracket. The arm is moveable from a folded position, in which the arm extends along the roof, to an unfolded position in which the arm extends along the side of the vehicle. The bracket extends outwards in a manner substantially parallel with the side of the vehicle when the arm is in the unfolded position. An object is receivable within the arm in the unfolded position and is storable on the roof when the arm is moved towards its folded position.

According yet a further aspect, there is provided a foldable roof rack assembly comprising an elongate mounting assembly. The roof rack assembly includes a foldable arm having a pair of pivotally connected together portions. A first one of the portions of the arm has a proximal end pivotally connecting to the mounting assembly and a distal end spaced-apart therefrom. A second one of the portions has a proximal end pivotally connecting to the distal end of the first one of the portions and has a distal end spaced-apart from its proximal end. The foldable arm is moveable from a folded position, in which the portions of the arm are folded together on top of and along the mounting assembly, to an unfolded position in which the portions of the arm extend outward for receiving and at least partially extending around an object.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
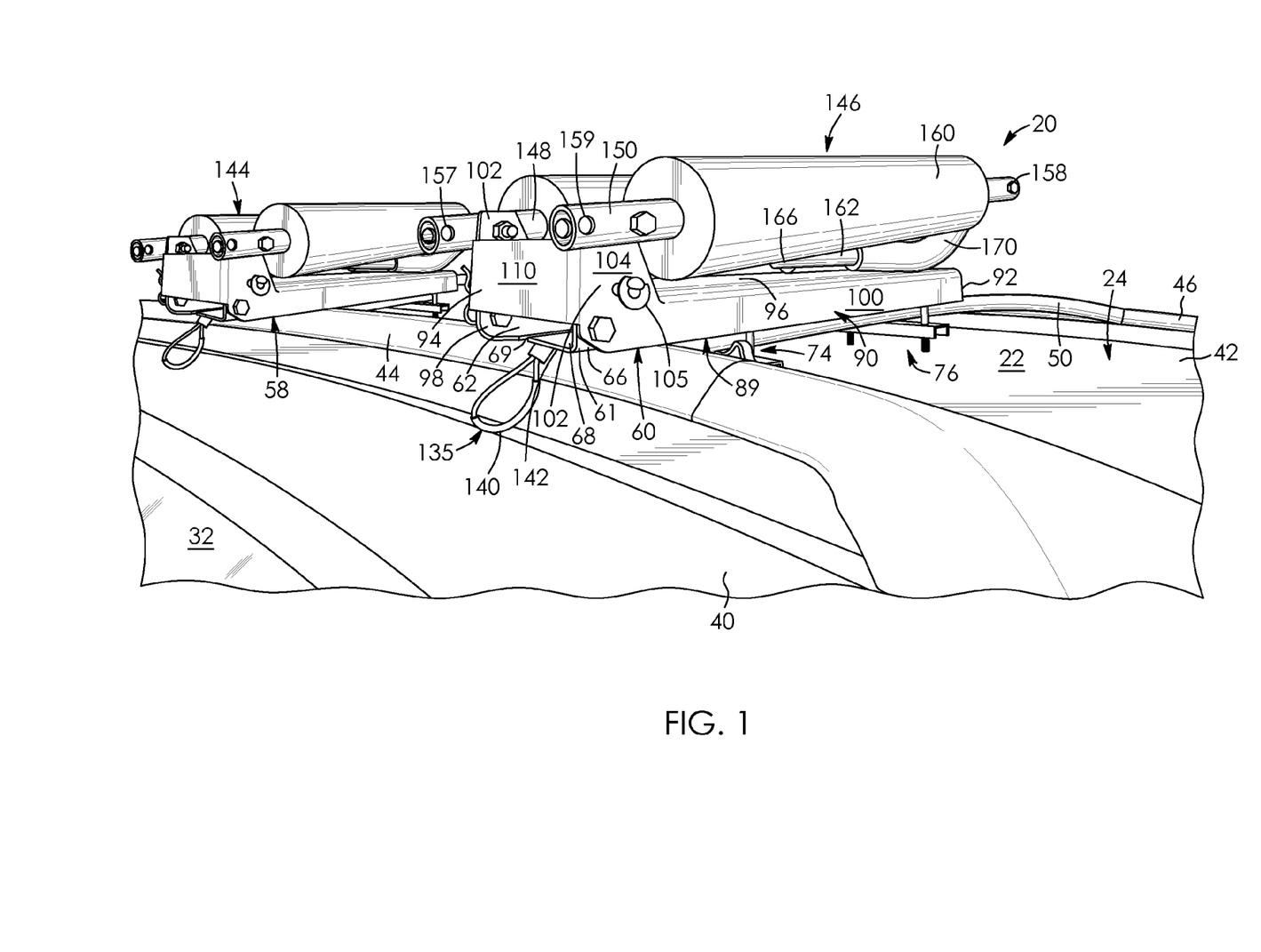
FIG. 1 is a side perspective view of a vehicle and a foldable roof rack assembly thereof according to one aspect, the assembly having a pair of mounting assemblies and a pair of foldable arm, the arms being shown in folded positions and the vehicle being shown in fragment.

Referring to the drawings and first to FIG. 1, there is shown a foldable roof rack assembly 20 for the roof 22 of a vehicle 24.

Figure 3:
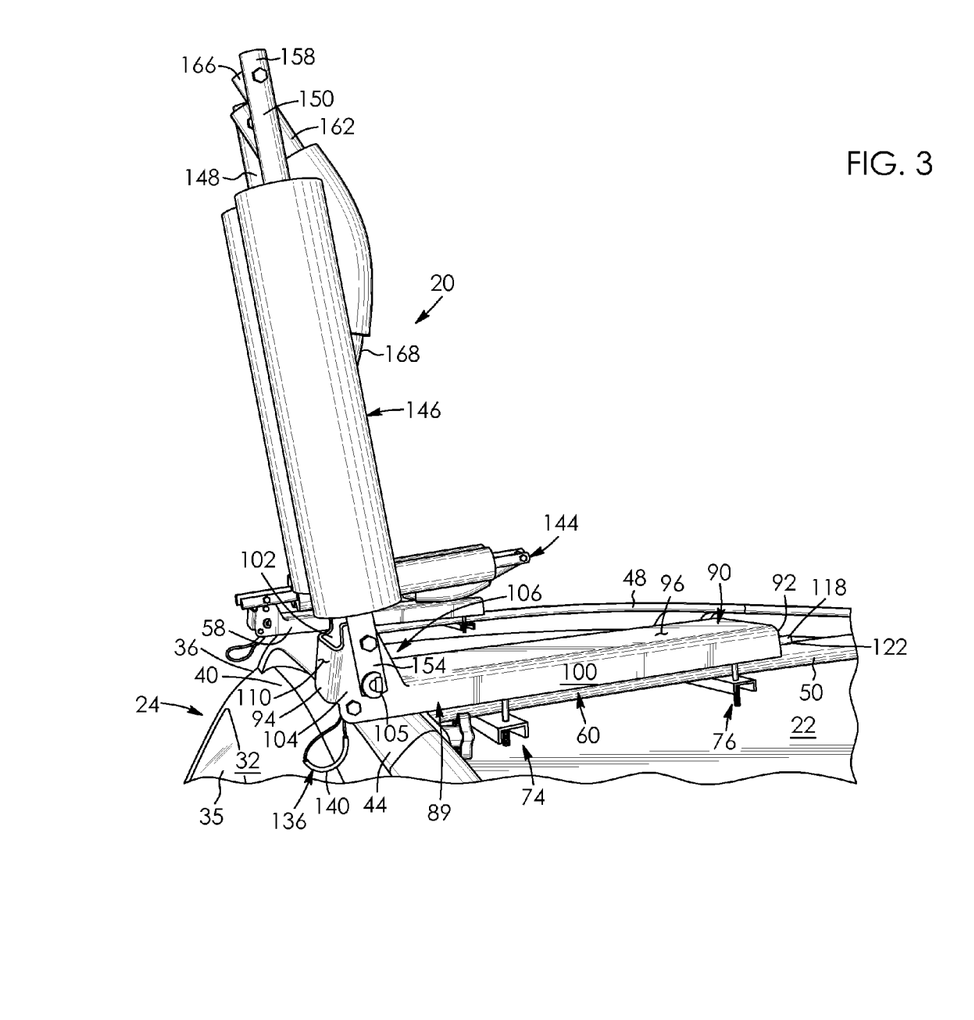
FIG. 3 is a front perspective view of the vehicle and foldable roof rack assembly of FIG. 1, showing one of the arms in a partially unfolded position, and the vehicle being shown in fragment.
Figure 6:
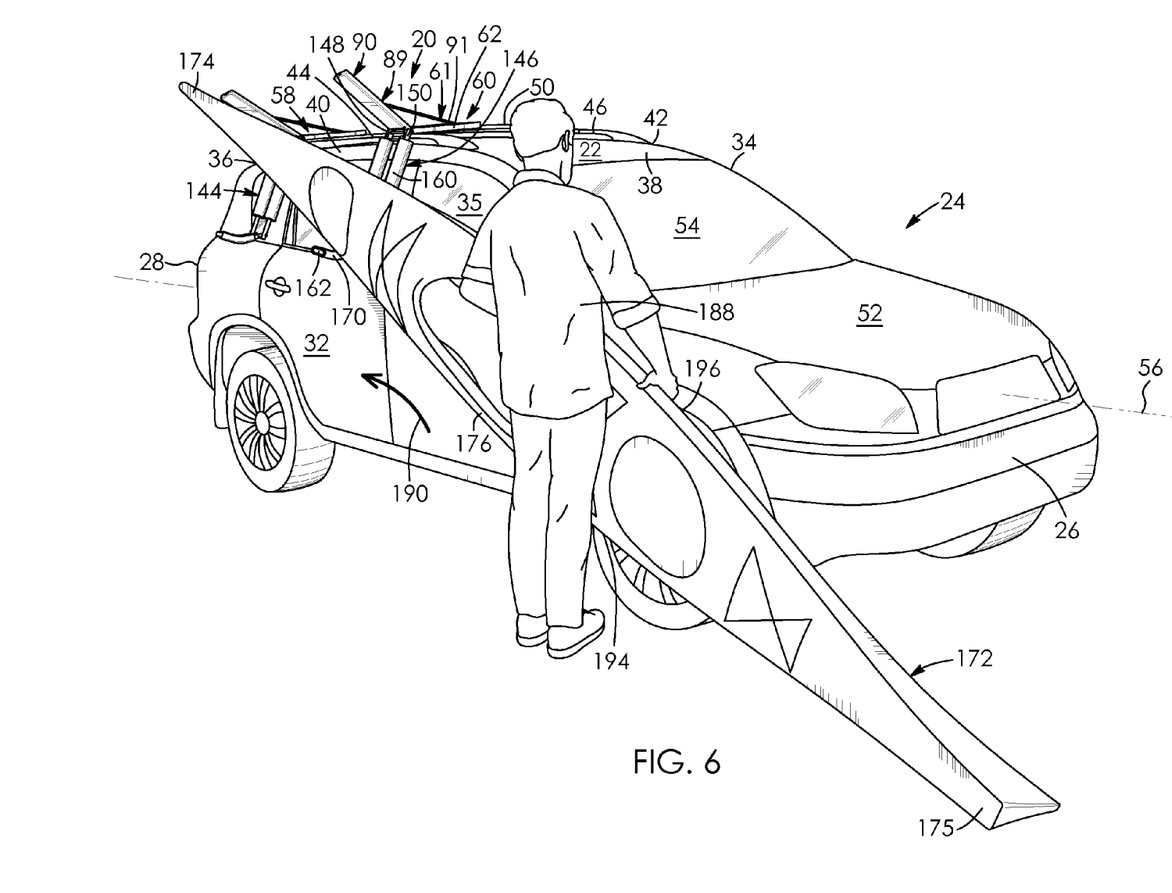
FIG. 6 is a side perspective view similar to FIG. 5 of the vehicle and foldable roof rack assembly of FIG. 5 and a kayak being held by a user thereof, with a front portion of the kayak resting on one of the unfolded arms of the roof rack assembly.

The vehicle is best seen in FIG. 6 and includes a front 26, a rear 28 spaced-apart from the front, and a pair of spaced-apart sides 32 and 34. Each of the sides includes side windows, as shown by window 35 for side 32. The sides 32 and 34 of the vehicle 24 extend from the front 26 to the rear 28 of the vehicle. The roof 22 extends from the rear towards the front of the vehicle 24. The roof is positioned above and extends between the sides 32 and 34 of the vehicle. The roof 22 has a rear end 36 positioned adjacent to the rear 28 of the vehicle and a front end 38 which is spaced-apart forward from the rear end. The roof 22 has a pair of peripheral edge portions 40 and 42 extending between the rear end and the front end thereof. The peripheral edge portions of the roof extend in parallel with and adjacent to sides 32 and 34, respectively, of the vehicle 24. The vehicle includes a pair of roof rails 44 and 46, in this example, which connect to and extend along respective ones of the peripheral portions 40 and 42 of the roof 22 and perpendicular to the vehicle. As best seen in FIG. 3, a pair of spaced-apart bars 48 and 50 connect to and extend between the rails. The bars are spaced-apart above and extend generally in parallel with the roof 22. Bar 48 is positioned adjacent to rear end 36 of the roof 22 and bar 50 is positioned closer to front end 38 of the roof in this example, as seen in FIG. 6.

Still referring to FIG. 6, the vehicle 24 has a hood 52 that extends from the front 26 towards the rear 28 of the vehicle. The vehicle also has a front windshield 54 that extends between the hood and forward end 38 of roof 22. The vehicle 24 has a longitudinal axis 56 interposed between the sides 32 and 34 thereof and which extends through the front 26 and rear 28 thereof. The vehicle is conventional, with its various parts and functionings being well-known to those skilled in the art, and therefore will not be described in greater detail.

Referring to FIG. 1, the foldable roof rack assembly 20 comprises a pair of spaced-apart, elongate mounting assemblies 58 and 60. The mounting assemblies are longitudinally spaced-apart relative to axis 56 seen in FIG. 6. The assemblies 58 and 60 are substantially the same in parts and functionings, and thus only assembly 60 will be described in detail.

Figure 2:
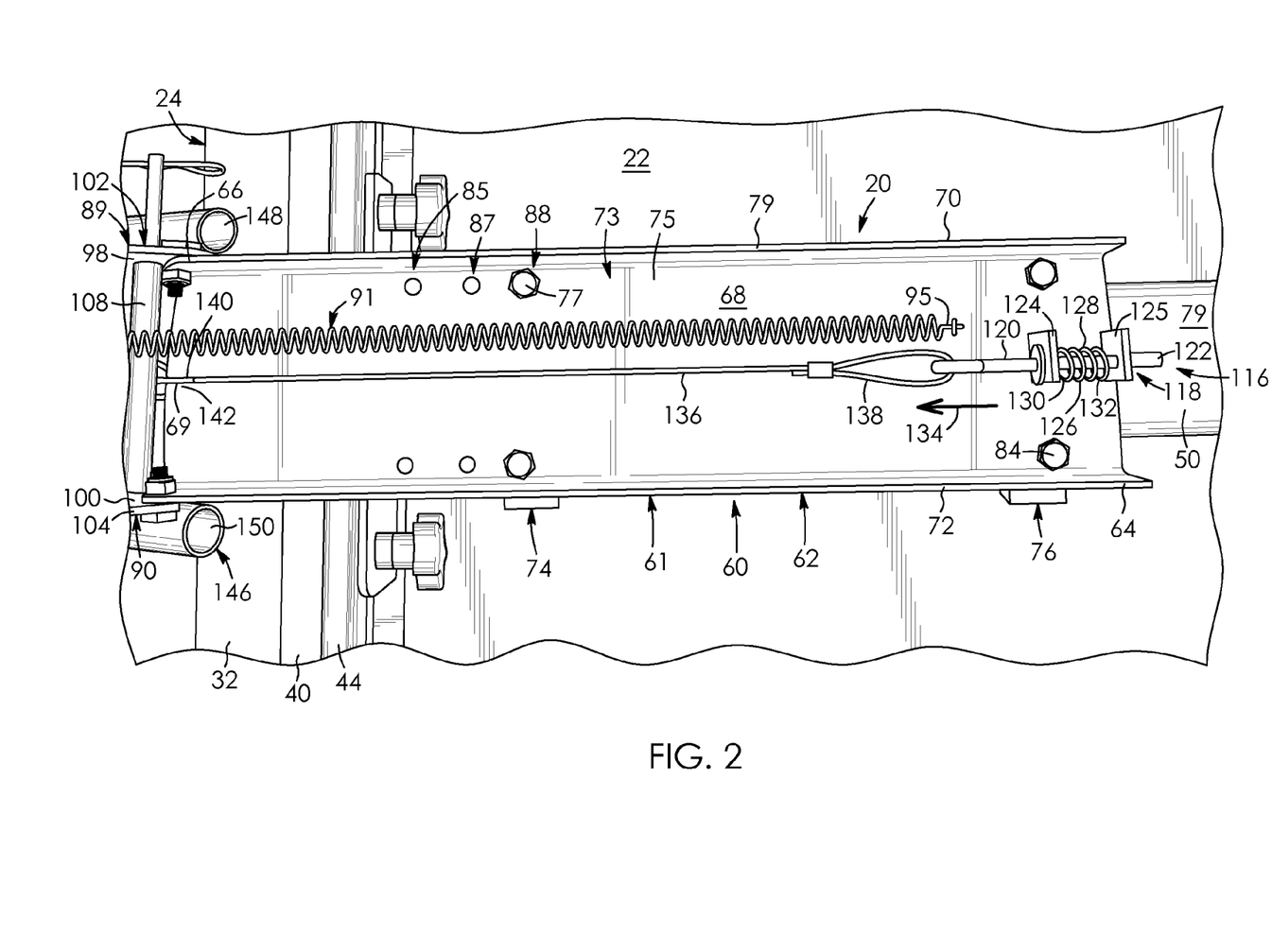
FIG. 2 is a top plan view of the vehicle and a base mount of one of the mounting assemblies of the foldable roof rack of FIG. 1, with the arms and with brackets of the mounting assemblies not being shown and the vehicle being shown in fragment.
Figure 8:
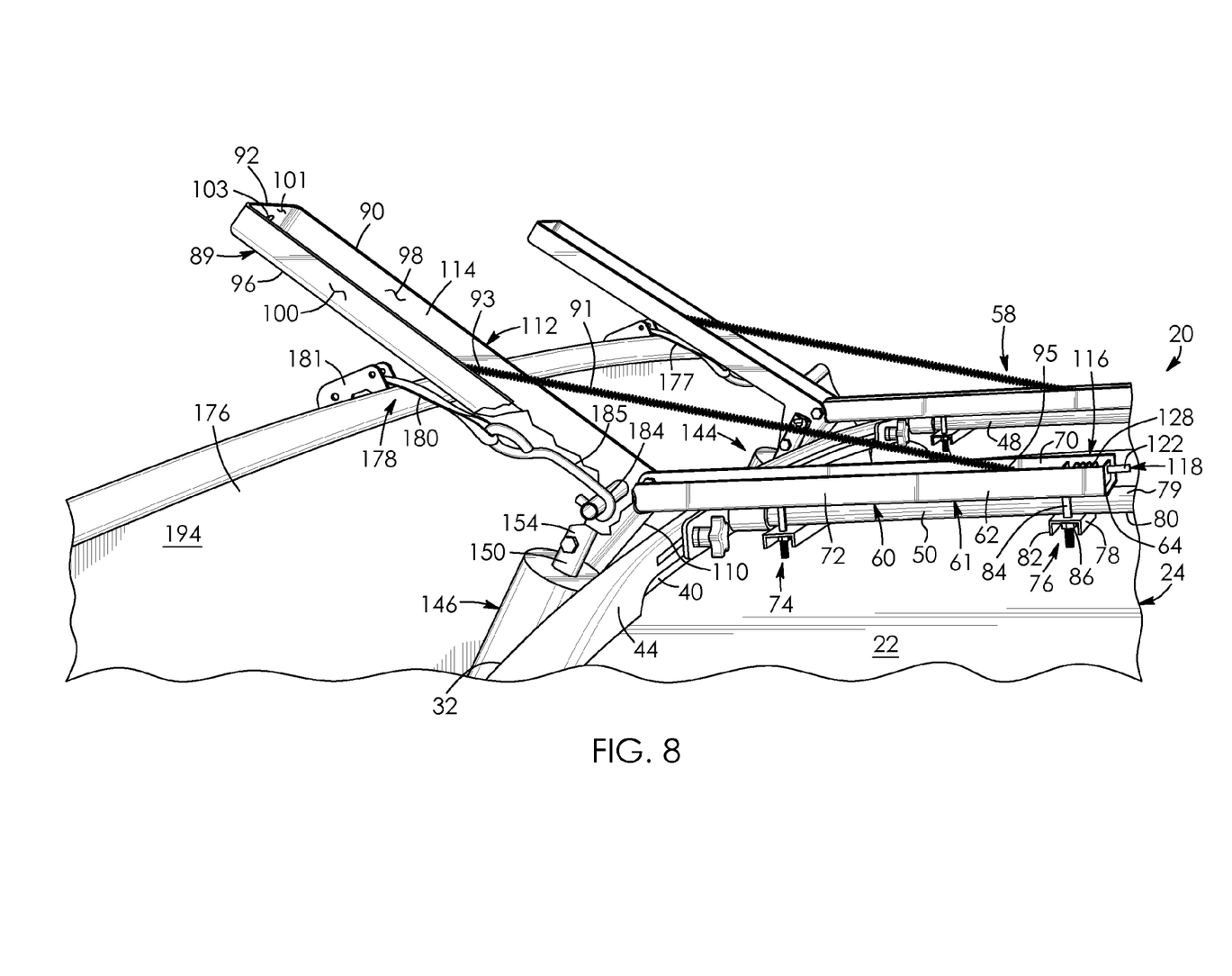
FIG. 8 is a front, top perspective view of the vehicle, foldable roof rack assembly and kayak of FIG. 7, the vehicle, roof rack assembly and kayak being shown in fragment, and one of the mounting assemblies being shown partially broken away.

Each mounting assembly comprises a first subassembly 61 having a base mount 62, best seen in FIGS. 2 and 8. Each base mount is connectable to and extendable along the roof 22. Each base mount 62 is an elongate member which is upwardly-facing and u-shaped in cross-section in this example. Referring to FIG. 8, each base mount 62 has a first end 64 which is inwardly spaced-apart from the side 32 of the vehicle 24 and a second end 66 which is spaced-apart from its first end. The second ends 66 of each base mount are positionable adjacent to the side 32 of the vehicle 24 and align with peripheral edge portions 40 in this example.

As seen in FIG. 2, each base mount 62 comprises a base plate 68 that extends substantially parallel with the roof, in this example, and a pair of spaced-apart side walls 70 and 72 connected to and extending upwards from the base plate, as seen in FIG. 2. The base plate and side walls are substantially rectangular in this example, and extend between the ends 64 and 66 of the base mount 62. Base plate 68 and side walls 70 and 72 form an enclosure 73 having an interior 75. Each of the plates 68 abuts and partially extends along the top 79 of a respective one of the bars 50 of the vehicle 24. Each base mount 62 is thus laterally extendable along the roof 22. As seen in FIGS. 1 and 2, each base plate includes a catch mechanism, in this example in the form of a slot 69. As seen in FIG. 2, each slot is centrally located between side walls 70 and 72, is positioned at end 66 of the base mount and extends from end 66 towards end 64 of its respective base mount.

As best seen in FIG. 8, each mounting assembly 60 includes a pair of spaced-apart connecting mechanisms 74 and 76 for selectively connecting the base mount 62 to the bars 50 of the vehicle 24. Each connecting mechanism in this example comprises an elongate member, in this example a u-shaped bracket 78 which extends perpendicular to and abuts the bottom 80 of its respective bar 50. Each base mount 62 and bracket 78 are selectively coupled together, with bar 50 interposed therebetween, via a pair of connectors, in this example bolts and nuts threadably connected thereto. The bolts and nuts are located by respective spaced-apart ends of bracket 78, with the bolts abutting base plate 68 in this example. This is shown in FIG. 8 by way of bolt 84 and nut 86 for connecting mechanism 76 which couple base mount 62 and bracket 78 together. Connecting mechanism 76 is positioned adjacent to end 64 of its base mount 62 in this example.

Referring to FIG. 2, connecting mechanism 74 is substantially the same as mechanism 74 with the exception that it further includes a plurality of longitudinally spaced-apart apertures, in this example in the form of three pairs of spaced-apart apertures 85, 87 and 88, through which its bolts 77 may selectively extend. Connecting mechanism 76 is thus laterally adjustable relative to the roof 22. Each mounting assembly 60 is thus selectively connectable to an existing roof rack (roof rails 44 and bars 50) of the vehicle 24 thereby.

As seen in FIG. 1, each mounting assembly 60 further comprises a second subassembly 89 which includes a hollow, outer housing 90. Each housing has a first end 92, best seen in FIG. 4, and a second end 94, best seen in FIG. 1, which spaced-apart from its first end. The ends of the housings 90 are closed in this example. Each housing 90 is elongate and u-shaped in cross-section in this example. The second ends 94 of the housings 90 are positionable adjacent to the side 32 of the vehicle 24. The second ends align with peripheral edge portions 40 of the vehicle's roof in this example and pivotally connect to respective ones of the second ends 66 of the base mounts 62 in this example.

Figure 4:
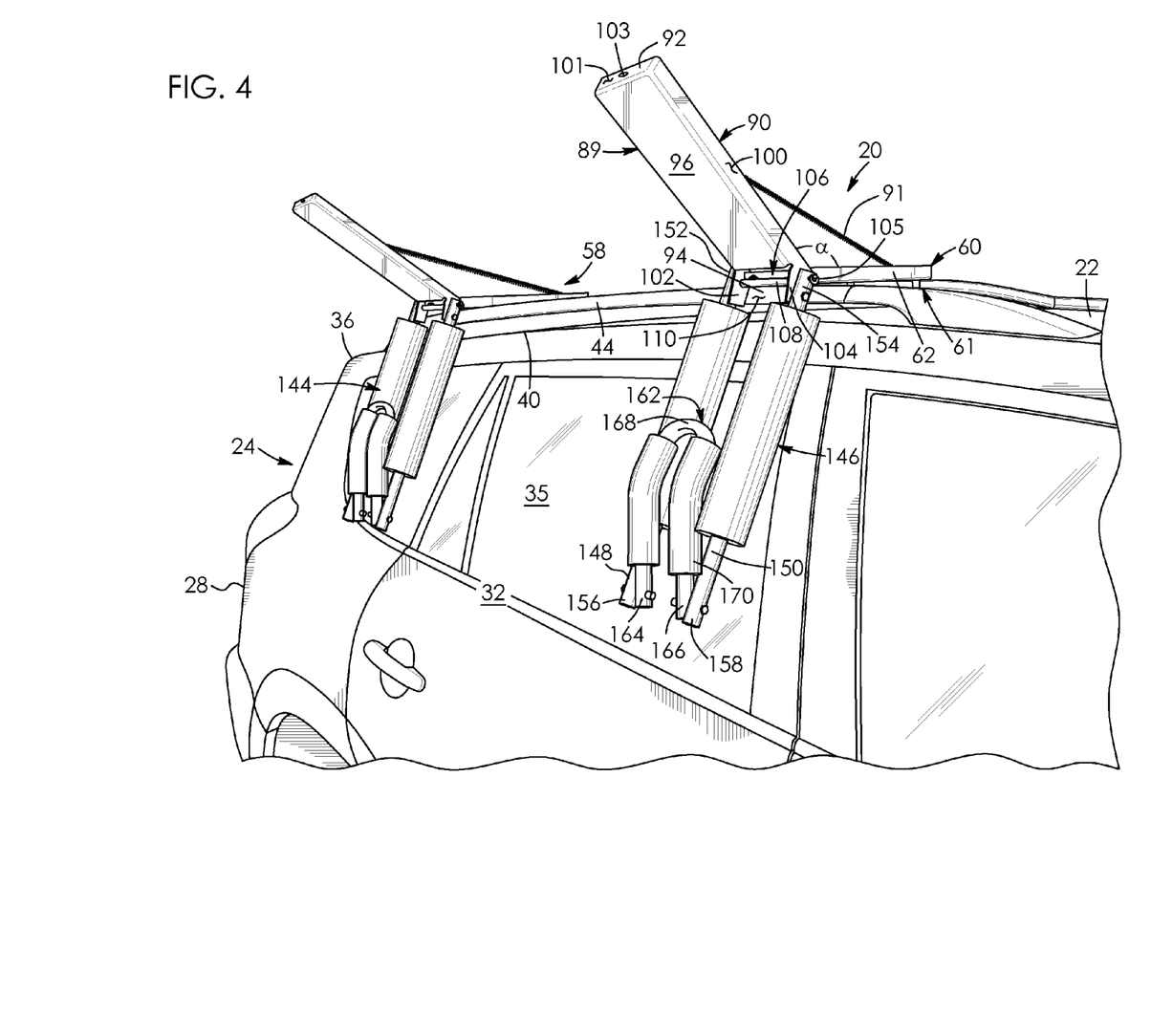
FIG. 4 is a side perspective view of the vehicle and foldable roof rack assembly of FIG. 1, showing inner portions of the arms extending along and aligning with the side of the vehicle in yet further partially unfolded positions of the arms, and the vehicle being shown in fragment.
Figure 9:
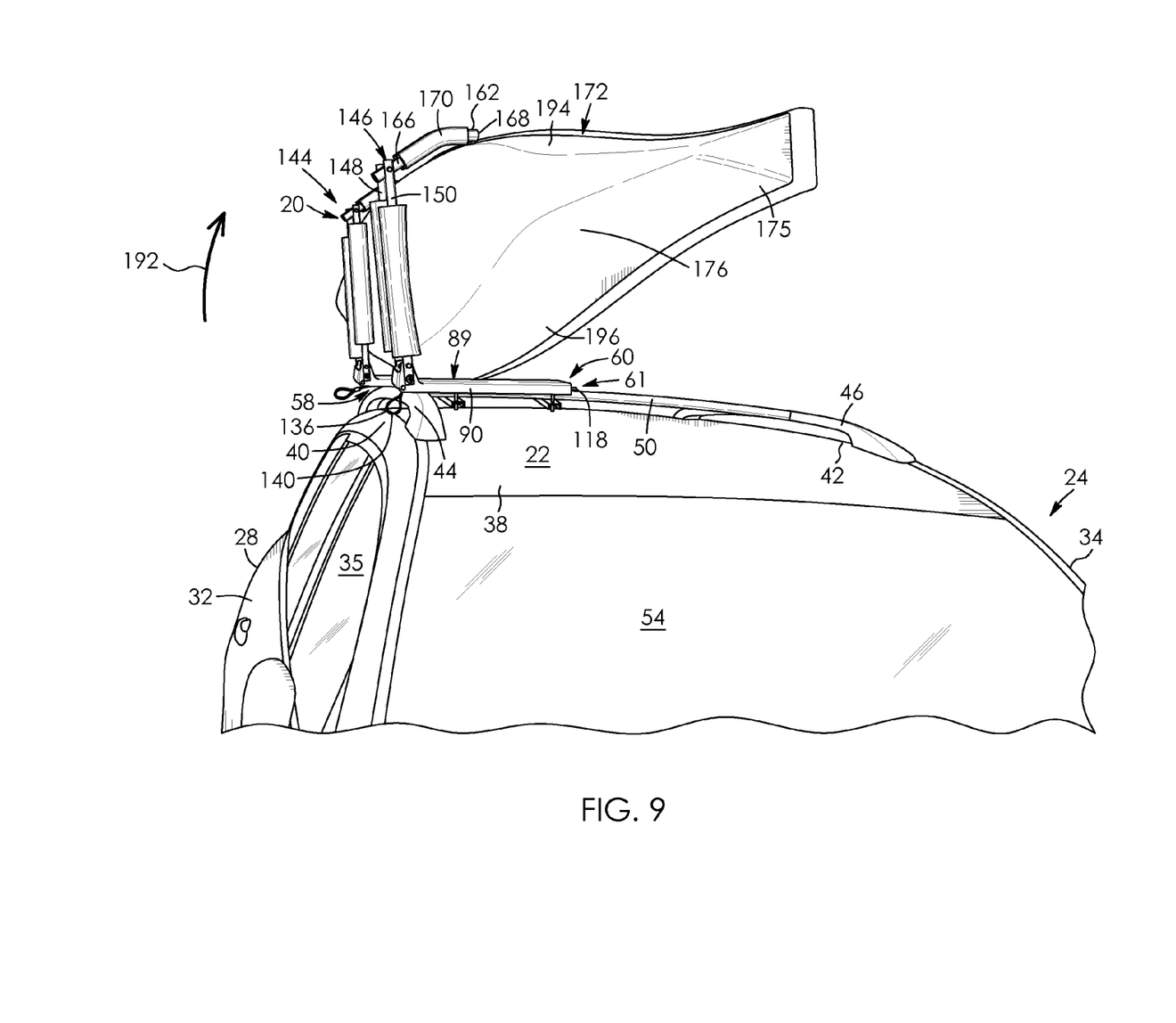
FIG. 9 is front perspective view of the vehicle, foldable roof rack assembly and rack of FIG. 8, with the arms being shown in a raised position and being shown biased towards their folded position, and with the kayak shown in a side elevated position and operatively connected to and extending longitudinally along the roof of the vehicle, with the vehicle being shown in fragment.

Each housing 90 has a first, folded horizontal position, shown in FIGS. 1 and 9, in which the housing aligns with the base mount. Each first subassembly 61 and second assembly 89 connect together in the folded position, with the housings 90 extending overtop of and receiving their respective base mounts 62 in this example. Each housing is moveable from its folded position to a second, unfolded raised position which is angularly spaced-apart therefrom, as seen in FIGS. 4 to 7. As seen in FIG. 4, the housings 90 are angularly spaced-apart from their base mounts 62 by an angle α in the unfolded position. Angle α is obtuse in this example and the housings extend outwards from both the roof 22 and side 32 of the vehicle when in their unfolded positions in this example.

Each housing 90 comprises a top plate 96 that extends substantially parallel with and is spaced-apart from the roof 22, in this example, when the housings are in their folded positions seen in FIGS. 1 and 9. Each housing comprises a pair of spaced-apart side walls 98 and 100 connected to and extending downwards from their top plate, as seen in FIG. 2, when the housing is in its folded position and from the perspective of FIG. 1.

Each second subassembly 89 resiliently connects to its corresponding first subassembly 61 in this example via a tension spring which biases the second subassembly towards its first subassembly. Referring to FIG. 8, this is shown by way of tension spring 91 having a first end 93 connected to top plate 96 of housing 90 and having a second end 95 that connects to bottom plate 68 of base mount 62, as seen in FIG. 2. The springs are in retracted positions in the configurations of the subassemblies shown in FIGS. 1, 3 and 9, and are in extended positions in the configurations shown in FIGS. 2 and 4 to 8.

As seen in FIG. 8, each housing 90 includes a first end plate 101 which connects to and extends downwards from its top plate 96 when the housing is in its folded position shown in FIG. 1. End plate 101 is adjacent to end 92 of the housing. The top plate 96, side walls 98 and 100 and first end plate 101 are substantially rectangular in this example. Side walls 98 and 100 extend between ends 92 and 94 of the housing 90. The side walls 98 and 100 align with and extend adjacent to the side walls 70 and 72 of the base mount 62, seen in FIG. 2, when the second subassembly 89 is in its folded position seen in FIG. 1. Each top plate 96 extends from end 92 towards end 94. The top plate abuts the tops 79 of the side walls 70 and 72, seen in FIG. 2, when the second subassembly 89 is in its folded position shown in FIG. 1 in this example.

As best seen in FIG. 4, each first end plate 101 has an aperture 103 extending therethrough. Each aperture 103 is centrally positioned between side walls 98 and 100 in this example.

As seen in FIG. 1, each housing 90 includes a pair of spaced-apart protrusions, in this example in the form of a pair of brackets 102 and 104 which extend from respective ones of side walls 98 and 100. The brackets are located adjacent to second ends 94 of the housings 90 in this example. The brackets 102 and 104 are coupled to and are integrally formed with the side walls 98 and 100. They are substantially in the shape of right trapezoids in this example. As seen in FIG. 1, the brackets 102 and 104 extend substantially upwards and vertical direction, in this example, when their respective second subassembly 89 is in its folded position. As seen in FIG. 4, each bracket 102 and 104 extends substantially parallel with the side 32 of the vehicle 24 in this example when its respective second subassembly 89 is in its unfolded position.

Each second subassembly 89 includes a pair of outwardly-facing, spaced-apart spring-loaded pins located on respective ones of its brackets, as seen by spring-loaded pin 105 mounted on bracket 104 in FIG. 1. Spring-loaded pins per se, including their various parts and functionings, are well-known to those skilled in the art and therefore will not be described in further detail.

As seen in FIG. 4, each second subassembly 89 has an aperture 106 located between respective brackets 102 and 104 and positioned between its top plate 96 and end 94 of its housing 90.

Each second subassembly 89 has a mounting member, in this example a rod 108 coupled to and extending between brackets 102 and 104. Each rod is in communication with one of the apertures 106. Each housing 90 has a second end plate 110 which extends between brackets 102 and 104 and which is rectangular in shape in this example. As seen in FIG. 8, top plate 96, side walls 98 and 100, end plates 101 and 110 form an enclosure 112 having an interior 114. The enclosure is shaped to extend overtop of and receives base mount 62, as seen in FIG. 1.

The foldable roof rack assembly 20 further comprises a pair of locking mechanisms for its respective mounting assemblies, as shown by locking mechanism 116 in FIG. 2. The locking mechanisms are positioned within the respective enclosures 73 of the base mounts 62. Each locking mechanism selectively retains its second subassembly 89 in its folded position relative to the respective first subassembly 61. Each locking mechanism 116 in this example has a spring-biased pin 118 with a proximal end 120 and a distal end 122 spaced-apart therefrom. End 122 is spring-biased to extend laterally inwards towards the other side 34 of the vehicle 24 and extend outwards from end 64 of base mount 62 towards side 34 of the vehicle seen in FIG. 6. Referring back to FIG. 2, each locking mechanism 116 includes a pair of spaced-apart mounts 124 and 125 through which pin 118 slidably extends. Each mechanism includes a spring 128 which abuts mount 124 at one end 130 thereof and which connects to the pin 118 at another end 132 thereof. Pulling on end 120 of the pin 118 towards side 32 of the vehicle 24 in the direction shown by arrow 134 compresses spring 128 against mount 124 and causes end 122 of the pin to retract inwards towards the base mount 62. Spring 128 biases end 122 of the pin 118 outwards from the base mount thereafter upon releasing end 120. Spring-biased pins, including their various parts and functionings, are well-known to those skilled in the art and therefore will not be described in further detail.

Each first subassembly 61 includes an actuating member, in this example a wire cable 136. Each cable has a first end 138, which is looped in this example and coupled to end 134 of the pin 118. Each cable 136 has a second end 140, best seen in FIG. 1, which is also looped in this example and which is alignable with the peripheral edge portion 40 of the vehicle 24. Each cable aligns with and extends substantially in parallel with base plate 68 of its respective base mount 62, in this example, extending from adjacent end 64 of the base mount to end 66 thereof. Each cable 136 may selectively extend through slot 69, with looped end 140 abutting adjacent portions 142 of base plate 68, for storing the cable when the second assembly is in its folded position shown in FIG. 1. Referring to FIGS. 1, 3 and 8, end 122 of pin 118 is shaped to selectively extend through aperture 103 in end plate 101, seen in FIG. 8, for selectively coupling together the second subassembly 89 and the first subassembly 61 in the folded position seen in FIG. 1. In order to move each second subassembly from its folded position to an unfolded position, looped end 140 seen in FIG. 1 is removed from slot 69 and actuated outwards, to dislodge pin 118, seen in FIG. 2, from slot 69, seen in FIG. 8.

Referring to FIG. 4, the foldable roof rack assembly 20 also has a pair of spaced-apart, foldable arms 144 and 146. Each of the arms is substantially the same in parts and functionings and therefore only foldable arm 146 will be described in detail. An inner, first portion of each arm 146 comprises a pair of spaced-apart, elongate, rigid members, in this example elongate tubes 148 and 150. The tubes are substantially straight in this example. The tubes 148 and 150 have proximal ends 152 and 154 that pivotally connect to brackets 102 and 104, respectively, of mounting assembly 60. The tubes have distal ends 156 and 158 which are spaced-apart from their proximal ends. As seen in FIG. 1, the tubes 148 and 150 have apertures 157 and 159 extending therethrough at their distal ends in this example. The apertures are shaped to selectively receive the spring-loaded pins 105 for holding the arms in place and fixing their positioning relative to housings 90 when said pins are actuated outwards, the apertures are aligned with the pins, and the pins are released thereafter. This is shown in FIG. 3.

Figure 5:
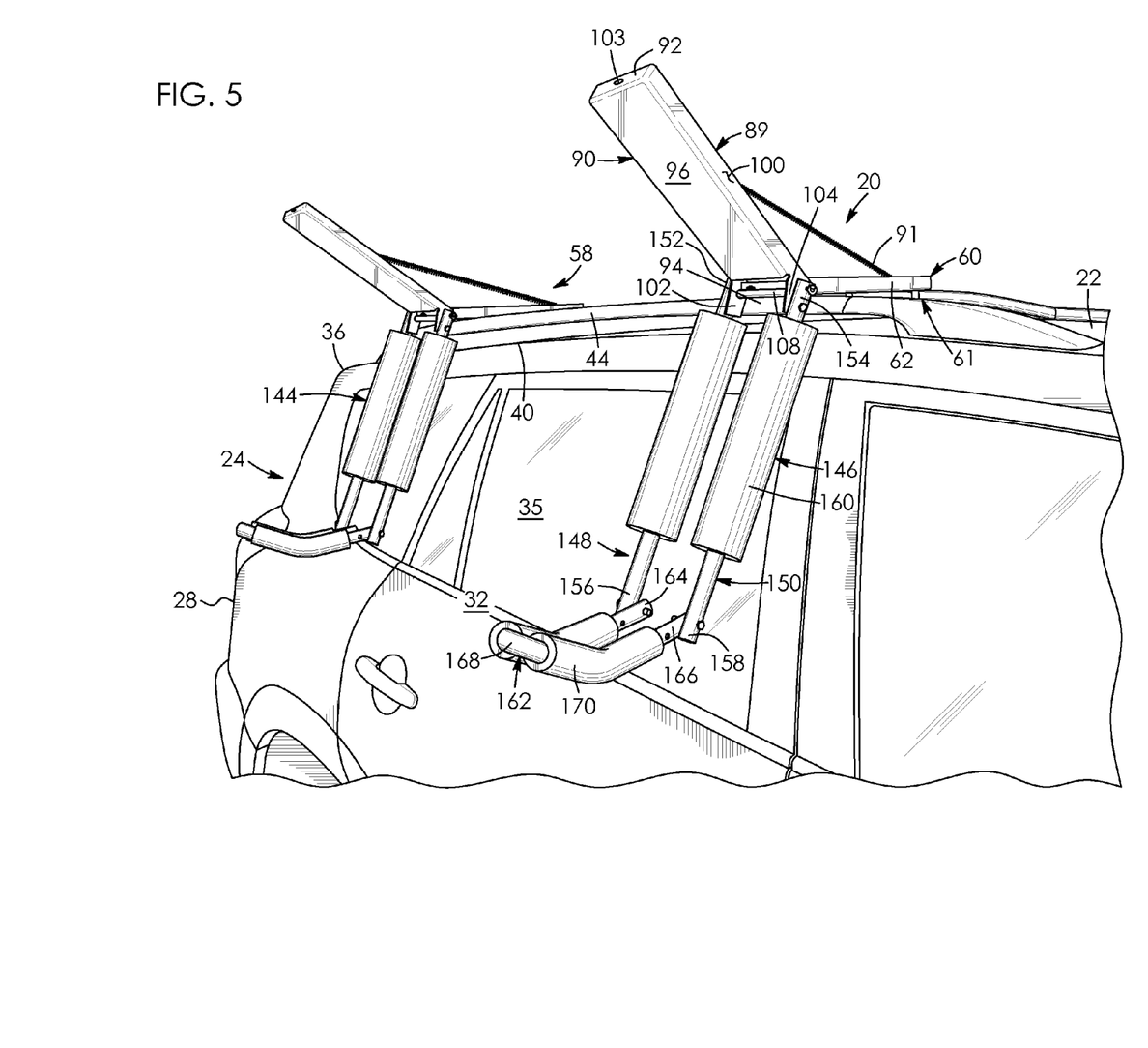
FIG. 5 is a side perspective view of the vehicle and foldable roof rack assembly of FIG. 1, showing each of the arms in a fully unfolded position, with outer portions of the arms extending outwards from the inner portions of the arms, and the vehicle being shown in fragment.

Referring to FIG. 5, each of the tubes 148 and 150 includes cushioning members extending therearound which extend from adjacent their proximal ends towards their distal ends. This is shown by cushioning member 160 which is tubular and made of foam plastic in this example. Member 160 extends around tube 150.

Each arm 146 has an outer, second portion which is rigid and comprises a u-shaped member, in this example a u-shaped tube 162. The u-shape is not strictly required and tube 162 may have other shapes in other embodiments. The tube has proximal ends 164 and 166 which pivotally mount near the terminuses of the distal ends 156 and 158, respectively, of tubes 148 and 150, as seen in FIG. 5. Each u-shaped tube 162 has an arc-shaped distal end 168, in this example, which is spaced-apart from its proximal ends. Each tube includes a pair of cushion members, in this example, which extend from its distal end 168 towards its proximal ends, as shown by cushion member 170 in FIG. 5. Cushioning member 170 is tubular and made of foam plastic in this example.

Each foldable arm 146 has a folded position, shown in FIG. 1, in which the portions of the arm, in this case tubes 148 and 150 and tube 162, are folded together on top of each other in the horizontal position, with the arm thus extending along the mounting assembly 60. The tubes of the arm 146 are thus folded together laterally along the roof 22 in the folded position and are positioned substantially parallel with the mounting assembly and the roof 22 in the folded position. Each tube 162 is interposed between its corresponding tubes 148 and 150 and top plate 96 of housing 90 when its arm 146 is in its folded position. Cushioning members 170 abut both cushioning members 160 and mounting assembly 60 in this example when the arm 146 is in its folded position.

Each arm 146 is moveable from the horizontal folded position of FIG. 1 to an unfolded, lowered position, shown in FIGS. 5 to 8, in which the portions of the arms extend outward for receiving and at least partially extending around an object, in this example kayak 172 seen in FIGS. 6 to 9. The kayak has a bow 174, a stern 175 spaced-apart from the bow and a hull 176 that extends between the bow and stern. The kayak 172 is conventional, with its various parts and functionings being well-known to those skilled in the art, and the kayak will thus not be described in further detail.

As seen in FIG. 5, tubes 148 and 150 are configured to extend along and extend substantially parallel with the side 32 and window 35 of the vehicle 24 in the unfolded position of the arms. Each arm 146 is part u-shaped in its unfolded position as shown. Tubes 162 are configured to extend outwards from the side 32 of the vehicle 24 when the arms are in the unfolded position. Referring to FIGS. 1 and 3, spring-loaded pins 105 extend through apertures 157 and 159 of the tubes 148 and 150 for holding said tubes in place in their unfolded position relative to housing 90. In their unfolded position, tubes 148 and 150 are angularly spaced-apart from their housing 90 by angle equal to approximately 90 degrees relative in this example.

Figure 7:
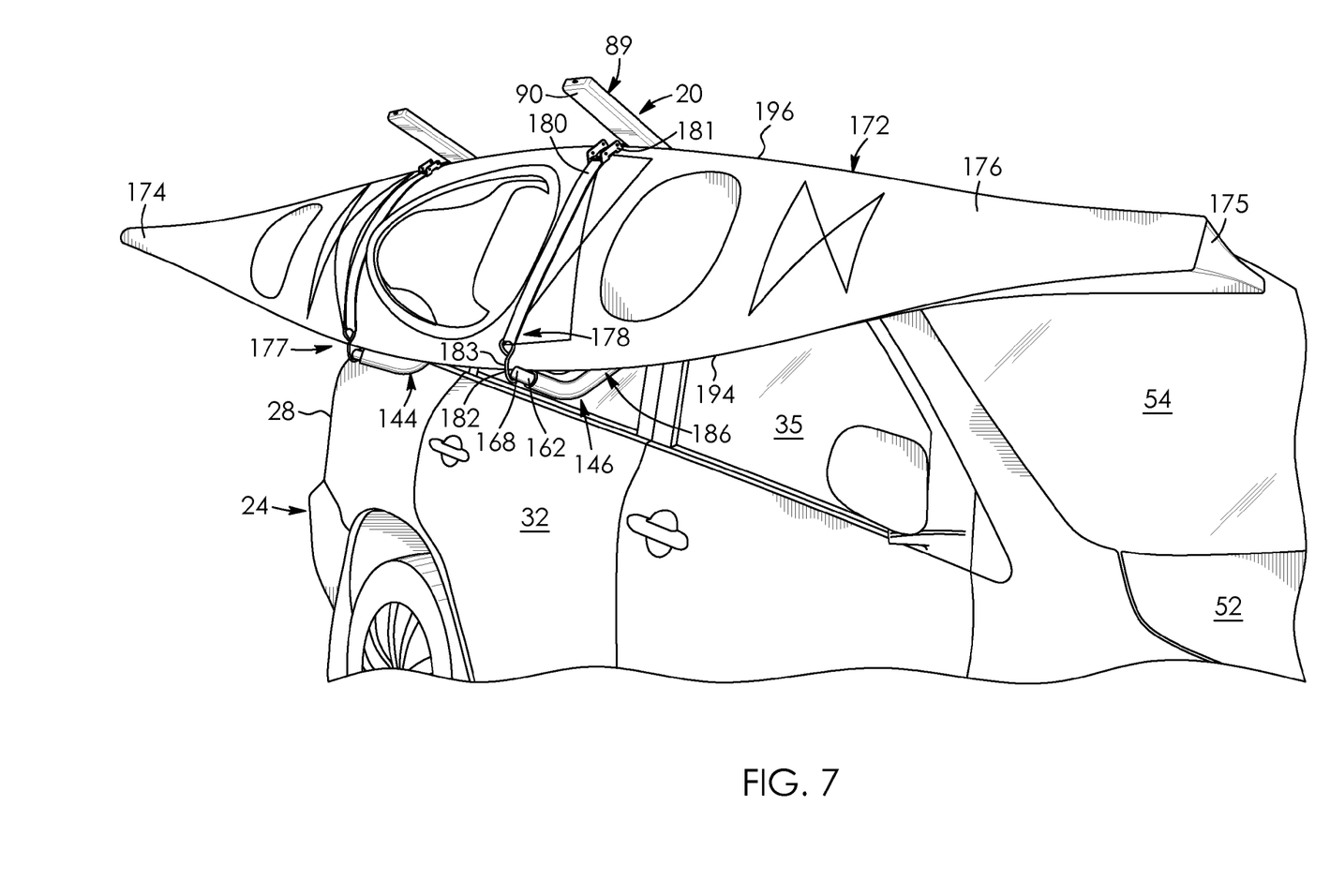
FIG. 7 is a side perspective view similar to FIG. 6 of the vehicle, foldable roof rack assembly and kayak, with the kayak resting on both of the unfolded arms and with straps extending from the outer portions of the arms to the mounting assembly for securing the kayak to the foldable roof rack assembly thereby, and with the vehicle being shown in fragment.

Referring now to FIGS. 7 and 8, the foldable roof rack assembly 20 comprises a pair of biasing and fastening assemblies 177 and 178 that selectively bias arms 144 and 146 towards their folded positions. Each of biasing and fastening assemblies is substantially the same in parts and functionings and therefore only biasing and fastening assembly 178 will be described in detail. Each biasing and fastening assembly comprises an elongate flexible member, in this example a length-adjustable strap 180 which may be selectively tightened or loosened via strap-length adjusting mechanism 181. The straps may be partially resilient.

As seen in FIG. 7, each biasing and fastening assembly 178 has a hook 182 at a first end 183 and which is selectively connectable to distal end 168 of its corresponding tube 162. As seen in FIG. 8, each biasing and fastening assembly has a second end 184 spaced-apart from its first end and which also has a hook 185. Strap 180 extends between and is coupled to ends 183 and 184. As seen in FIG. 7, the assembly 178 is connected at its end 183 to tube 162 and is shaped to extend around the hull 176 of the kayak 172. The assembly is configured to have its end 184 selectively connect to rod 108 of the second subassembly 89, as seen in FIG. 8. Referring to FIG. 7, each arm 146 and corresponding strap 180 form a cradle 186 for receiving the kayak 172. Strap-length adjusting mechanisms, including their various parts and functionings, are well-known to those skilled in the art and therefore will not be described in further detail.

In operation and referring to FIG. 1, in order to use the foldable roof rack assembly 20, tubes 148 and 150 of each arm 146 are rotated outwards until tubes 148 and 150 extend substantially upwards, as seen in FIG. 3. Spring-loaded pins 105 are next pulled outwards, apertures 157 and 159 of the tubes, seen in FIG. 1, are aligned with the pins, and the pins are released thereafter to extend through the apertures and retain the tubes in their position relative to housings 90.

End 140 of cable 136 is next pulled outwards from slot 69 of base plate 68 of the base mount 62. End 140 of the cable is then pulled laterally outwards in the direction of arrow 134 seen in FIG. 2. This causes pin 118, seen in FIG. 2, to retract from aperture 103 of end plate 101 of housing 90, shown in FIG. 4. Thereafter, second subassembly 89 may be selected rotated outwards from its folded position shown in FIG. 3 to its unfolded position shown in FIG. 4. In these positions, tubes 148 and 150 align with and are supported by side 32 of vehicle 24.

Tubes 162 are next unfolded so as to extend outwards from tubes 148 and 150 and side 32 of the vehicle 24, as seen in FIG. 5. Referring now to FIG. 6, user 188 may then lift up kayak 172, tilt one of its ends upwards, in this example bow 174, and rest the bow against arm 146. Stern 175 may then be raised upwards as the kayak slides along cushion members 160 and 170 and is pushed towards the other arm 144, as generally shown by arrow 190. The kayak may thus be moved until it is evenly balanced between and supported by arms 144 and 146, as seen in FIG. 7. Thereafter, hooks 183 of biasing and fastening assemblies 178 connect onto tubes 162 and the straps extend around the hull 176 of the kayak 172. Hooks 185 of the biasing and fastening assemblies next connect to rods 108 of the second subassemblies 89 and the straps may then be securely tightened to securely couple the kayak to the foldable roof rack assembly 20.

Lastly, the kayak so secured may then be tilted upwards, as shown with reference to arrow 192 in FIG. 9, until the second subassemblies 89 abut with the first subassemblies 61 seen in FIG. 2. Referring back to FIG. 9, ends 140 of cables 136 may be pulled outwards to retract pins 118 until apertures 103, seen in FIG. 4, align therewith. The pins may then be released to extend through the apertures and thus couple the second assemblies 89 and first subassemblies 61 together as seen in FIG. 9. The kayak 172 is thus securely connected to the foldable roof rack assembly 20, and thus roof 22 of the vehicle 24, so as to be on its side. In this case, sides 194 and 196 of the kayak 172 extend vertically with each other.

A similar roof rack assembly may be installed adjacent to side 34 of the vehicle 24 for maintaining additional objects such as an additional kayak, while still providing room for a further storage box between the kayaks if desired.

The foldable roof rack assembly 20 may be selectively folded in a compact manner shown in FIG. 1 by applying the above steps in reverse when the assembly is no longer required.

Figure 10:
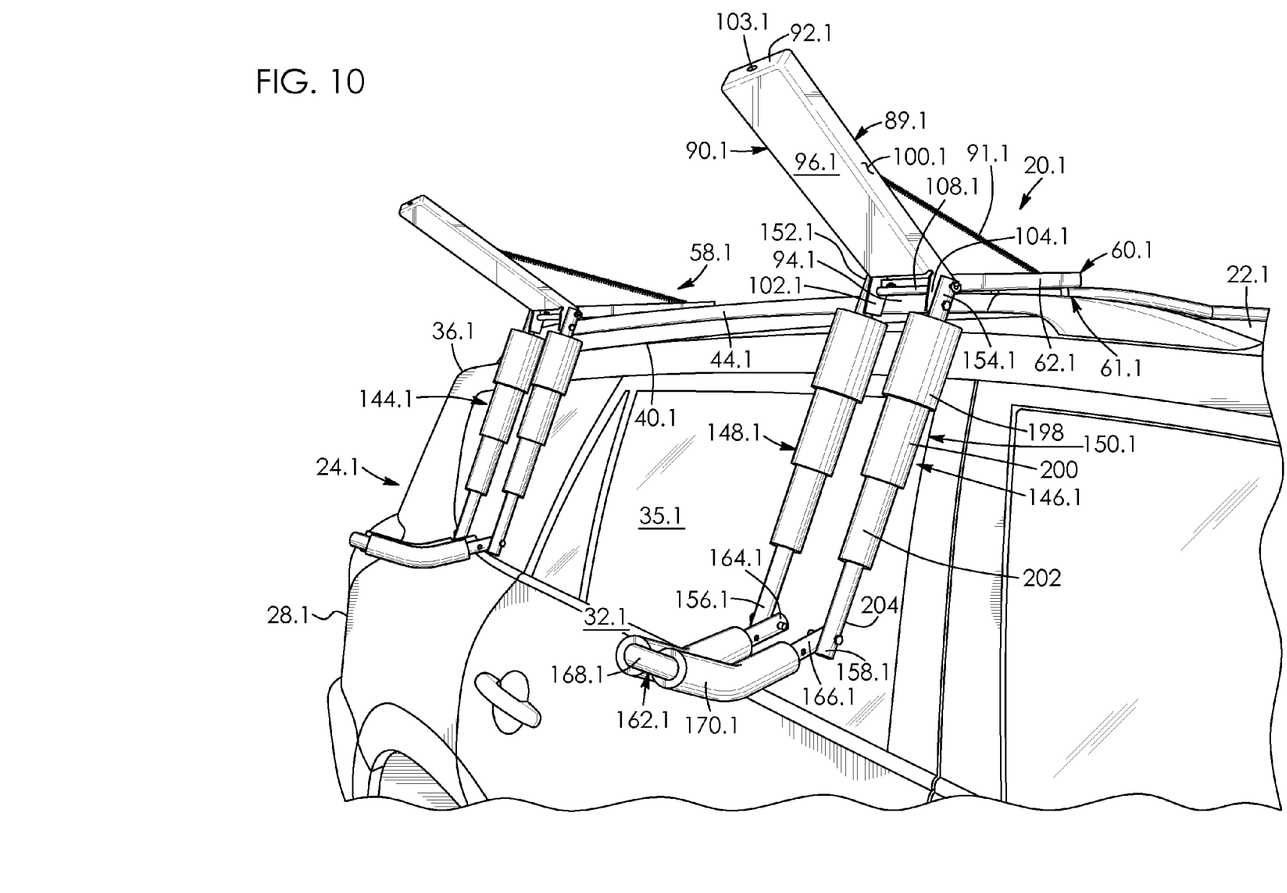
FIG. 10 is a side perspective view of a vehicle and foldable roof rack assembly similar FIG. 5 according to another aspect, showing each of the arms in a fully unfolded position, with outer portions of the arms extending outwards from the inner portions of the arms, the vehicle being shown in fragment, and the inner portions of the arms being telescopic and shown in a retracted position.
Figure 11:
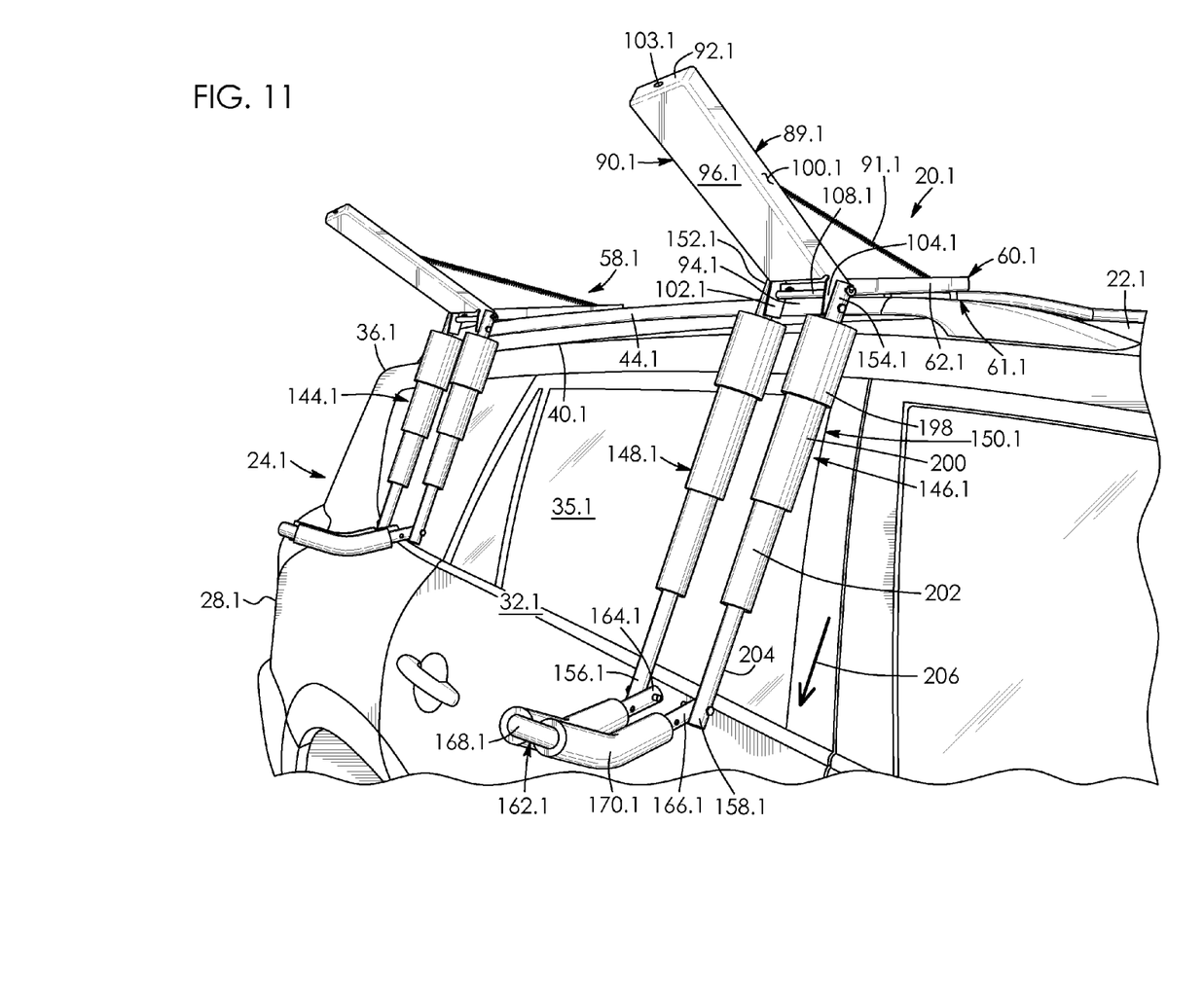
FIG. 11 is a side perspective view of the vehicle and foldable roof rack assembly of FIG. 10, with the inner portions of the arms shown in an extended position.

FIGS. 10 and 11 show a foldable roof rack assembly 20.1 according to a second aspect. Like parts have like numbers and functions as the foldable roof rack assembly 20 shown in FIGS. 1 to 9 with the addition of decimal extension "0.1". Foldable roof rack assembly 20.1 is substantially the same as foldable roof rack assembly 20 shown in FIGS. 1 to 9 with the exception that each of the arms 144.1 and 146.1 comprises tube assemblies 148.1 and 150.1 that are telescopic and are thus length-adjustable. Each of the tube assemblies comprises a plurality of tube portions of progressively smaller diameter, with each tube portion being shaped to receive to a subsequent one of the tube portions. This is shown by tube portions 198, 200, 202 and 204 for tube assembly 150.1. This may enable assembly 20.1 to extend around a greater variety of objects such as bicycles. FIG. 10 shows the assemblies 148.1 and 150.1 in retracted positions and FIG. 11 shows the assemblies in an extended position. The assemblies are spring-biased towards their retracted positions and may be selectively lowered and extended downwards, as shown by arrow 206. This may further facilitate the mounting of kayaks or the like on to tubes 162.1.

It will be appreciated that many variations are possible within the scope of the invention described herein. For example, pins 118 seen in FIG. 2 may operatively connect to the second subassembly 89 and be selectively extendable through an aperture of the first subassembly for selectively holding the assemblies together in another embodiment.

Length-adjustable straps 180 are not strictly required; for example, bungee cords or other elastic stretching members may be used to a similar end for the biasing and fastening assemblies.

It will be further understood by someone skilled in the art that many of the details provided above are by way of example only and are not intended to limit the scope of the invention which is to be determined with reference to at least the following claims.

What is claimed is:

1. A foldable roof rack assembly comprising:
 a mounting assembly connectable to a roof of a vehicle; and
 a foldable arm comprising a rigid first portion having a proximal end pivotally connecting to the mounting assembly and a distal end opposite said proximal end, and the foldable arm comprising a rigid second portion pivotally mounting near the terminus of the distal end of the first portion of the arm opposite pivotal connection of the first portion of the arm to the mounting assembly, the arm being moveable from a folded position, in which the portions of the arm are folded together laterally along and substantially parallel with the roof, to an unfolded position in which the portions of the arm extend outwards from the roof for receiving an object, the second portion of the arm being interposed between the first portion of the arm and the mounting assembly when the arm is in its folded position, and each of the first and second portions of the arm being configured to abut and at least partially extend around the object in the unfolded position.

2. The foldable roof rack assembly as claimed in claim 1, the vehicle having a side and wherein the arm is configured to at least partially extend along the side of the vehicle in the unfolded position.

3. The foldable roof rack assembly as claimed in claim 1 wherein the first portion of the arm comprises a pair of elongate members that pivotally connect to the mounting assembly and wherein the second portion of the arm comprises a u-shaped member having proximal ends pivotally connecting to respective ones of the elongate members and an arc-shaped distal end spaced-apart from the proximal ends thereof.

4. The foldable roof rack assembly as claimed in claim 1 wherein the first portion of the arm is substantially straight.

5. The foldable roof rack assembly as claimed in claim 1, the vehicle having a side and wherein the first portion of the arm is configured to extend along the side of the vehicle and be substantially parallel with the side of the vehicle when the arm is in the unfolded position and wherein the second portion of the arm is configured to extend outwards from the side of the vehicle when the arm is in the unfolded position.

6. The foldable roof rack assembly as claimed in claim 1 wherein the arm is at least partially u-shaped when the arm is in its unfolded position.

7. The foldable roof rack assembly as claimed in claim 1 wherein the arm is telescopic.

8. The foldable roof rack assembly as claimed in claim 1 wherein the portions of the arm include cushioning members extending therearound, the cushioning members being configured to abut the object.

9. The foldable roof rack assembly as claimed in claim 1 further comprising an elongate flexible member that selectively extends between the second portion of the arm and the mounting assembly, the mounting assembly, the arm and the elongate flexible member forming a cradle for receiving the object.

10. The foldable roof rack assembly as claimed in claim 1 wherein the mounting assembly comprises a base mount that is connectable to the roof and a pivotable bracket extending outwards from and pivotally connecting to the base mount, the arm pivotally connecting to the bracket.

11. The foldable roof rack assembly as claimed in claim 10, the vehicle having a side and wherein the bracket extends outwards in a manner substantially parallel with the side of the vehicle when the arm is in the unfolded position.

12. The foldable roof rack assembly as claimed in claim 1 further including a biasing and fastening assembly that selectively biases the arm towards the folded position.

13. In combination, a kayak and the foldable roof rack assembly as claimed in claim 1, the object being the kayak.

14. The foldable roof rack assembly as claimed in claim 1, further including an elongate flexible member connectable to the second portion of the arm, the first and second portions of the arm and the elongate flexible member forming a cradle for receiving the object when the arm is in its unfolded position.

15. The combination as claimed in claim 13 wherein the kayak is on its side when securely connected to the foldable roof rack assembly.

16. In combination, a vehicle and the foldable roof rack assembly as claimed in claim 1.

\* \* \* \* \*